United States Patent [19]

Kegelart et al.

[11] 3,917,663

[45] Nov. 4, 1975

[54] METHOD OF MAKING ALKALI METAL PERCARBONATES

[75] Inventors: Willy Kegelart, Brussels; Francis Nisol, Lillois-Witterzee, both of Belgium

[73] Assignee: Solvay & Cie, Brussels, Belgium

[22] Filed: Nov. 14, 1972

[21] Appl. No.: 306,219

[30] Foreign Application Priority Data

Nov. 15, 1971 France ............................. 7140860

[52] U.S. Cl. ............................................. 423/415 P
[51] Int. Cl.² ......................................... C01B 15/10
[58] Field of Search ........ 423/415, 419, 421, 415 P; 252/186; 23/313

[56] References Cited
UNITED STATES PATENTS

| | | | |
|---|---|---|---|
| 1,950,320 | 3/1934 | Muller | 423/421 X |
| 2,986,448 | 5/1961 | Gates et al. | 423/421 |
| 3,441,388 | 4/1969 | Knapp et al. | 423/305 |
| 3,677,697 | 7/1972 | Yanush | 423/421 |
| 3,701,737 | 10/1972 | Goldstein | 23/313 X |
| 3,711,254 | 1/1973 | McGowan et al. | 23/313 |
| 3,748,103 | 7/1973 | Bean et al. | 23/313 |

Primary Examiner—Oscar R. Vertiz
Assistant Examiner—Gary P. Straub
Attorney, Agent, or Firm—Larson, Taylor Hinds

[57] ABSTRACT

A continuous process for the manufacture of an alkali metal percarbonate. An aqueous hydrogen peroxide solution and an aqueous alkali metal carbonate solution are introduced into a mixer which contains particles of the corresponding percarbonate. The wet percarbonate thus formed is dried. A portion of the dried percarbonate is recycled to the mixer and remaining percarbonate is removed as product.

17 Claims, 1 Drawing Figure

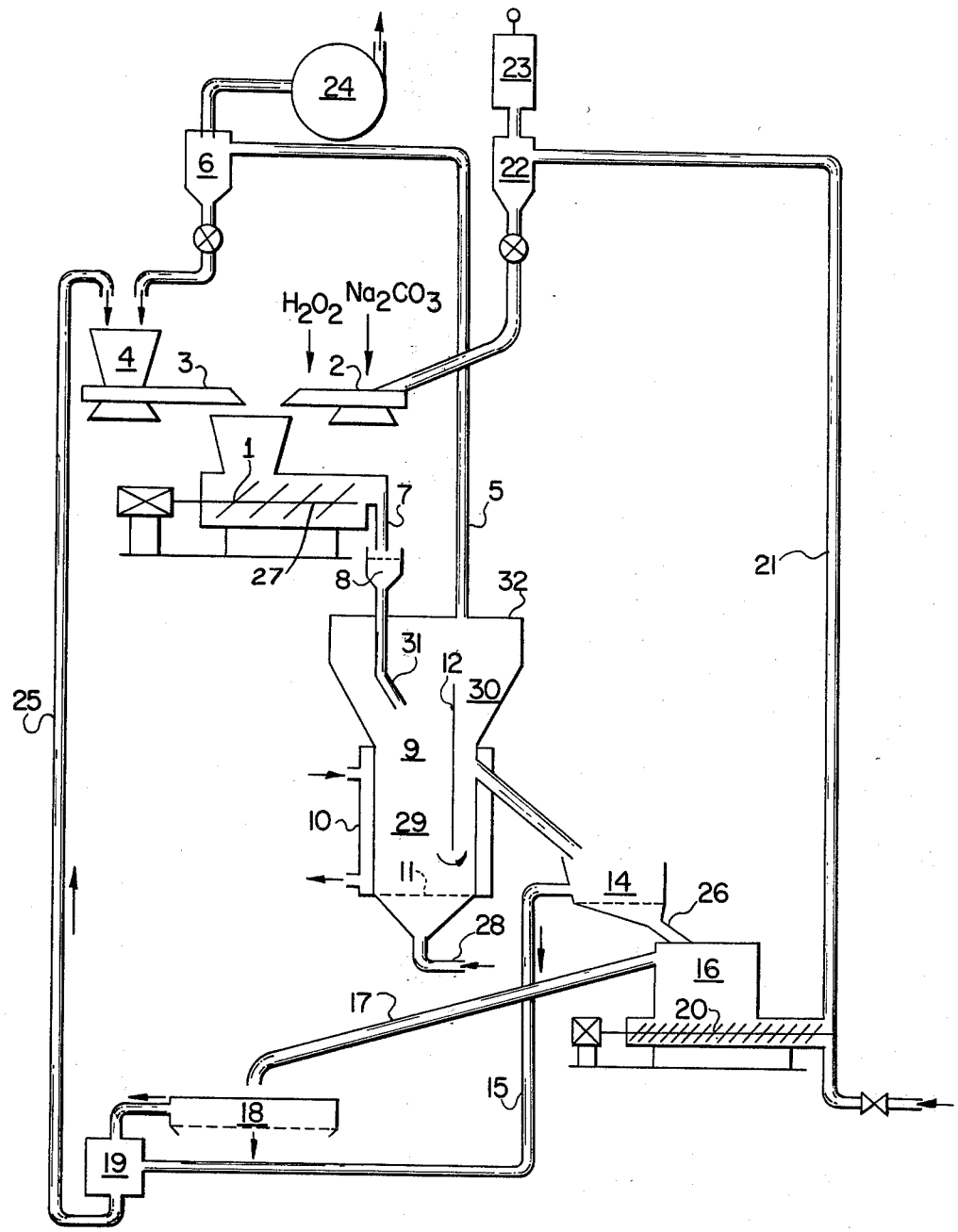

METHOD OF MAKING ALKALI METAL PERCARBONATES

The present invention relates to a process for the manufacture of alkali metal percarbonates. The word "percarbonates" is used herein to denote a peroxyhydrate produced by contacting an alkali metal carbonate with hydrogen peroxide.

Traditionally, alkali metal percarbonates, particularly the sodium salt, have been manufactured by a process involving oxidation by hydrogen peroxide of a solution of an appropriate carbonate. The percarbonate thus formed is salted out of solution at a temperature of from 10°C to 20°C, sodium chloride being the salting out agent normally employed. The precipitate is separated from its mother liquor, for example by centrifuging, and is dried, for example, in a fluidized bed. The process requires many separate chemical engineering stages and careful control to produce crystalline percarbonate having good dewatering properties.

Other processes such as drying by atomization yield powdery or fine crystalline products.

Another process of preparing alkali metal percarbonates is that of Denaeyer et al., copending U.S. application Ser. No. 106,546, now abandoned. This process involves forming an aqueous medium supersaturated with percarbonate by reacting together an aqueous solution of an alkali metal carbonate and an aqueous solution of hydrogen peroxide and continuously evaporating, in a fluidized bed dryer fluidized with air at a temperature within the temperature range between 100° and 180°C, the water contained in the aqueous medium in the constant presence of seeds having dimensions smaller than those of the granules to be obtained.

However, encrusting of the pipes used to feed the supersaturated solution to the fluidized bed dryer can disturb the process.

To avoid this disadvantage, it has been proposed in copending U.S. application Ser. No. 106,546 to feed the fluidized bed dryer by separate solutions of hydrogen peroxide and alkali carbonate. This process requires only simple apparatus but can lead to high losses of hydrogen peroxide, and increased decomposition of the percarbonate.

According to the present invention there is provided a continuous process for the manufacture of an alkali metal percarbonate comprising the steps of introducing an aqueous hydrogen peroxide solution and an aqueous alkali metal carbonate solution into a mixer containing particles of a corresponding percarbonate, thereby forming a wet percarbonate, drying the wet percarbonate, recycling a portion of dried percarbonate to the mixer, and withdrawing remaining dried percarbonate. Preferably, percarbonate fines are introduced into the mixer as well.

Advantageously, the dried percarbonate which is withdrawn from the process (i.e., the product) comprises particles having sizes within a predetermined range of sizes. Conventional means for classification, for example sieving, may be used to effect separation of the product from percarbonate which is recycled. Preferably, at least some oversized particles are crushed before recycling to the mixer. Any suitable means of crushing may be employed. The particles should be crushed so that the fines so produced have a range of particle sizes determined, at least in part, by the predetermined particle size range of the product. As an example, if the predetermined particle size range of the product is from 0.25 mm to 0.5 mm, then the range of sizes of the fines should be from about 0.1 mm to 0.2 mm. It is envisaged that at least 90 percent of the percarbonate leaving the drier may be recycled to the mixer. Consequently, it is usually preferable on economic grounds to classify only part of the percarbonate leaving the drier, and to recycle the remainder without classification, or alternatively dried crusts and agglomerates are removed from all the percarbonate leaving the drier and then part of the crust-free percarbonate is further classified. Preferably the crusts and agglomerates so removed are crushed to form fines and then recycled to the mixer.

Preferably the alkali metal carbonate solution and hydrogen peroxide solution are introduced into the mixer at a temperature of from 10°C to 40°C, suitably at about ambient temperatures.

The alkali metal carbonate is introduced into the mixer as an aqueous solution, because solid sodium carbonate, for example when substantially anhydrous, may fail to react completely with the hydrogen peroxide, thereby producing an alakli metal percarbonate having inferior active oxygen content. Secondly, solid alkali metal carbonates may adhere less well to the corresponding percarbonate particles than the percarbonate particles adhere to themselves, thereby leading to production of an increased proportion of fines.

Preferably the alkali metal carbonate has a relatively high solubility in water, such as sodium or potassium carbonate. Preferably the solution contains at least 15 percent, suitably of the order of about 30 percent by weight of carbonate. Preferably, the aqueous hydrogen peroxide solution has a concentration of at least 20 percent by weight, and advantageously not more than 70 percent by weight. Either or both of the solutions may contain standard stabilizers for alkali metal percarbonate such as alkali metal silicates or alkaline earth metal silicates. Alternatively the solutions may contain precursors which on mixing form the chosen stabilizer. For example, the hydrogen peroxide solution may contain magnesium sulphate, and the alkali metal carbonate solution may contain sodium silicate.

Preferably the alkali metal carbonate and hydrogen peroxide are introduced into the mixer in a molar ratio of from 1:1.4 to 1:1.6, particularly about 1:1.47.

Under conditions of continuous working, various types of continuous mixers may be used, for example a screw mixer or rotary drum fitted with a wiper, or preferably a trough equipped with one or more horizontally disposed shafts carrying blades. It will be understood that in preferred embodiments, alkali metal percarbonate particles may grow during the process by either absorption of alkali metal carbonate solution and hydrogen peroxide solution followed by deposition of percarbonate on drying, or by addition of percarbonate "fines" to other percarbonate particles, percarbonate formed by deposition from solution acting as binder.

The wet alkali metal percarbonate leaving the mixer should preferably have a water content of not more than 10 percent, advantageously less than 5 percent by weight. For continuous working, the amounts of alkali metal carbonate and hydrogen peroxide added to the mixer should be substantially equivalent to the amount of alkali metal percarbonate withdrawn from the process after the drying stage. Thus, the concentrations of hydrogen peroxide and alkali metal percarbonate may be suitably adjusted so as to obtain a steady rate of production and a suitable wetness in the percarbonate leaving the mixer.

In preferred embodiments, the wet percarbonate leaving the mixer passes through separating means, such as sieves, which separate out and/or breakdown agglomerates.

Conventional industrial driers may be used such as rotary drums, vibratory driers, vertical air driers or preferably, fluidized bed driers. Suitably the bed may be fluidized by an inert gas, particularly air, which gas on leaving the drier has, preferably, a relative humidity of no more than 80 percent in order to minimize percarbonate decomposition. Preferably, the fluidized bed should be maintained at a temperature of at least 55°C, and less than 100°C, advantageously from 55°C to 80°C by, for example, heating the fluidizing gas entering the bed to a suitable temperature such as about 200°C, supplemented if necessary, by additional heating provided by a jacket around the bed. Small particles of percarbonate are carried out of the drier by the fluidizing gas, the size of the particles carried being determined by, for example, their density and by the air speed. It can be seen that by employing a suitable air speed, substantially all particles below a predetermined size may be separated from the fluidized mass. Preferably the undersized particles are recycled to the mixer.

In preferred embodiments, all the undesirably large particles of percarbonate are withdrawn from the percarbonate leaving the drier, for example, by sieving, and advantageously are crushed and recycled to the mixer. When the product is to have a range of sizes of from say 0.25 to 0.5 mm, particles of about 2 mm or larger are undesirably large.

In a further aspect of the invention there is provided a process for the manufacture of sodium percarbonate comprising the steps of introducing at an ambient temperature, an aqueous solution containing from 20 to 70 percent by weight hydrogen peroxide, and an aqueous solution containing from 15 to 34 percent by weight of sodium carbonate into a mixer containing particles of sodium percarbonate to produce wet sodium percarbonate having a water content of less than 5 percent by weight, passing the wet sodium percarbonate into a fluidized bed drier, maintaining the bed at a temperature of from 55°C to 80°C, and a relative humidity of fluidizing gas leaving the fluidized bed of not more than 80 percent, withdrawing from the bed dried sodium percarbonate, withdrawing part of the dried sodium percarbonate and recycling remaining dried sodium percarbonate to the mixer, separating the withdrawn part into particles having sizes within a predetermined range, and particles outside the range, crushing oversized particles, and recycling to the mixer the crushed particles and undersized particles.

An apparatus which may be used to carry out the process according to the present invention is described hereinafter with reference to, and is illustrated by, the drawing which accompanies the present specification, showing a cross-sectional view in the vertical plane.

The apparatus comprises feeding ducts 2 and 3 for introducing materials into a mixer 1 having an outlet 7 connected via a sieve 8 to a fluidized bed drier 9. The drier 9 has an air outlet 5 leading via a cyclone 6 and hopper 4 to the feeding duct 3 and a percarbonate take-off point 13 leading to a hopper containing a vibratory sieve 14 fitted with a first outlet 15 above sieve level which leads via a crusher 19 and a return duct 25 and the hopper 4 to the feeding duct 3, and with a second outlet 26 below sieve level which leads to a hopper 16 having an upper outlet 17 which leads to a sieve 18 having an outlet above sieve level to the crusher 19, and a lower outlet which leads via an air lift 21 and cyclone 22 fitted with a sleeve filter 23 to the feeding duct 2.

The feeding ducts 2 and 3 are vibratory. The mixer comprises a feeding hopper at one end of an enclosed trough, in which trough a motor-driven shaft 27 bearing angled blades, rotates, about a horizontal axis, and the outlet 7 at the other end, such outlet having a lower lip at axis level. The sieve 8 is vibratory, having mesh size of 8–10 mm, and carrying a few large porcelain beads. The fluidized bed drier 9 is made from stainless steel and comprises an air inlet 28, a perforated base plate 11 having holes 2 mm in diameter and 18 mm apart. A lower cylindrical chamber 29 surrounded by a heating jacket 10 houses the actual fluidized bed 9, and is provided with the take-off point 13, and upper cylindricoconical expansion chamber 30 above the bed 9, having a percarbonate inlet 31, a closure 32 and the air outlet 5. A vertical plate 12 extends across the drier 9 dividing the drier, as seen in a horizontal cross-section into segments, the larger segment having the percarbonate inlet 31, and the smaller segment the percarbonate take-off 13. The plate 12 does not extend to the base plate 11 or to the closure 32.

The hopper 16 is sloped towards the upper outlet, a motor-driven worm conveyor 20 leading via the lower outlet to the airlift 21.

In operation, an aqueous solution of sodium carbonate and an aqueous hydrogen peroxide solution together with dry recycled sodium percarbonate are fed to the feeding duct 2 and hopper to the mixer 1. Damp sodium percarbonate passes through the outlet 7 to the vibratory sieve 8 where agglomerates of percarbonate are separated out and are broken down by the beads. Agglomerate-free percarbonate is then passed into the fluidized bed drier 9, where it passes under separator plate 12 and out through take-off point 13. Air to fluidize the bed passes through base plate 11 to homogenize the flow and through air outlet 5, the air bearing small particles of dried percarbonate which are separated out by the cyclone 6, and which are recycled to the mixer 1 via the hopper 4 and feeding duct 3. A fan 24 withdrawing air through air outlet 5 ensures that the fluidized bed operates under slightly reduced pressure. The percarbonate passes out through conduit 13 into sieve 14, which separates out oversized particles which pass via outlet 15 to the crusher 19 and thence via return duct 25 to the feeding duct 3. Suitably sized particles pass through the sieve 14 into hopper 16, from whence a small percentage pass through upper outlet 17 to the sieve 18, from whence oversize particles pass to the crusher 19. Particles passing through the sieve 18 constitute the product. The remainder of the material in the hopper 16 is conveyed by the worm screw 20, through the lower outlet, and air-lift 21 and cyclone 22 to the feeding duct 2.

One embodiment of the invention will now be described more fully by way of Example only.

EXAMPLE

In the Example sodium percarbonate was manufactured using the apparatus described herein with reference to the accompanying drawing for a period of a week. During that period the working conditions were as follows:

Materials were introduced into a mixer having a capacity of 70 l at the following rates:

| Materials | Rate of Introduction kg/hour |
| --- | --- |
| Hydrogen Peroxide (expressed as 100%) | 1.80 |
| Sodium Carbonate (expressed as 100%) | 3.82 |
| Sodium Percarbonate and | 450 to 500 |
| Sodium Percarbonate fines | 12.5 to 15 |

The molar ratio of hydrogen peroxide to sodium carbonate was about 1.47:1. The hydrogen peroxide was introduced as a 24 percent aqueous solution containing 30g of magnesium sulphate heptahydrate per kg of hydrogen peroxide (expressed as 100%). The sodium carbonate was introduced as a 30 percent aqueous solution containing 40g of 36° Beaume sodium silicate per kg of sodium carbonate (expressed as 100%). Both solutions, together with the 450–500, kg/hour of sodium percarbonate were introduced via duct 2. The sodium percarbonate fines were introduced via duct 3, and comprised 7 to 8 kg/hour recovered from the fluidizing gas by the cyclone 6, and 5.5 to 7 kg/hour recovered from the crusher. The crusher was fed from 0.5 to 1 kg/hour of crusts and agglomerates from the sieve 14 and by from 5 to 6 kg/hour of oversized particles from the sieve 18, and crushed to produce particles of from 0.1 to 0.2 mm diameter.

The residence time of percarbonate in the mixer was from 2 to 4.5 minutes and wet percarbonate leaving the mixer had a water content of from 3 to 4 percent by weight.

The wet percarbonate passing into the drier had a particle size of less than 8 to 10 mm. Air at a temperature of 220°C was passed at a rate of 60 m³ per hour into the fluidized bed, the air speed through the bed being 0.67 m/sec and relative humidity of the air in outlet 5 being approximately 75 percent. Steam passing through the heating jacket under a pressure of 10/9 atmospheres and 175°C maintained the bed at a temperature of 70°C. The sieve 14 had a mesh of 2 mm and the sieve 18 of 0.5 mm. The amount of sodium percarbonate passing through the sieve 18 and constituting the produce remained throughout the run more or less equal to the amount of sodium percarbonate that was passed to the crusher 19, and was approximately equivalent to the amount of carbonate and hydrogen peroxide added to the mixer. The mean diameter of sodium percarbonate recycling remained at about 0.5 mm through the run.

The physical properties of the product were:

| The physical properties of the product were: | | |
| --- | --- | --- |
| Active oxygen content | | 142 g/kg |
| Apparent specific weight (a) | | 1.14 kg/dm³ |
| Fluidity (b) | | 3.0 seconds |
| Particle sizes | | |
| weight % of | 0.500 mm | 0.2 |
| weight % of | 0.350 mm | 42.7 |
| weight % of | 0.200 mm | 86.7 |
| weight % of | 0.125 mm | 99.9 |
| weight % of | 0.088 mm | 100.0 |
| mean particle diameter | | 0.355 |
| wear index (c) | | < 1 |
| Stability | | % of active oxygen lost |
| after 7 days at 50°C & 68% Relative Humidity | | 2 |
| after 14 days at 50°C & 68% Relative Humidity | | 4 |

| -continued | |
| --- | --- |
| The physical properties of the product were: | |
| after 1 hour at 100°C & 68% Relative Humidity | 7 |

Properties (a) and (b) were measured by the test defined in British Patent No. 913688 (Solvay et Cie) and property (c) in British Patent No. 1,202,670 (Solvay et Cie).

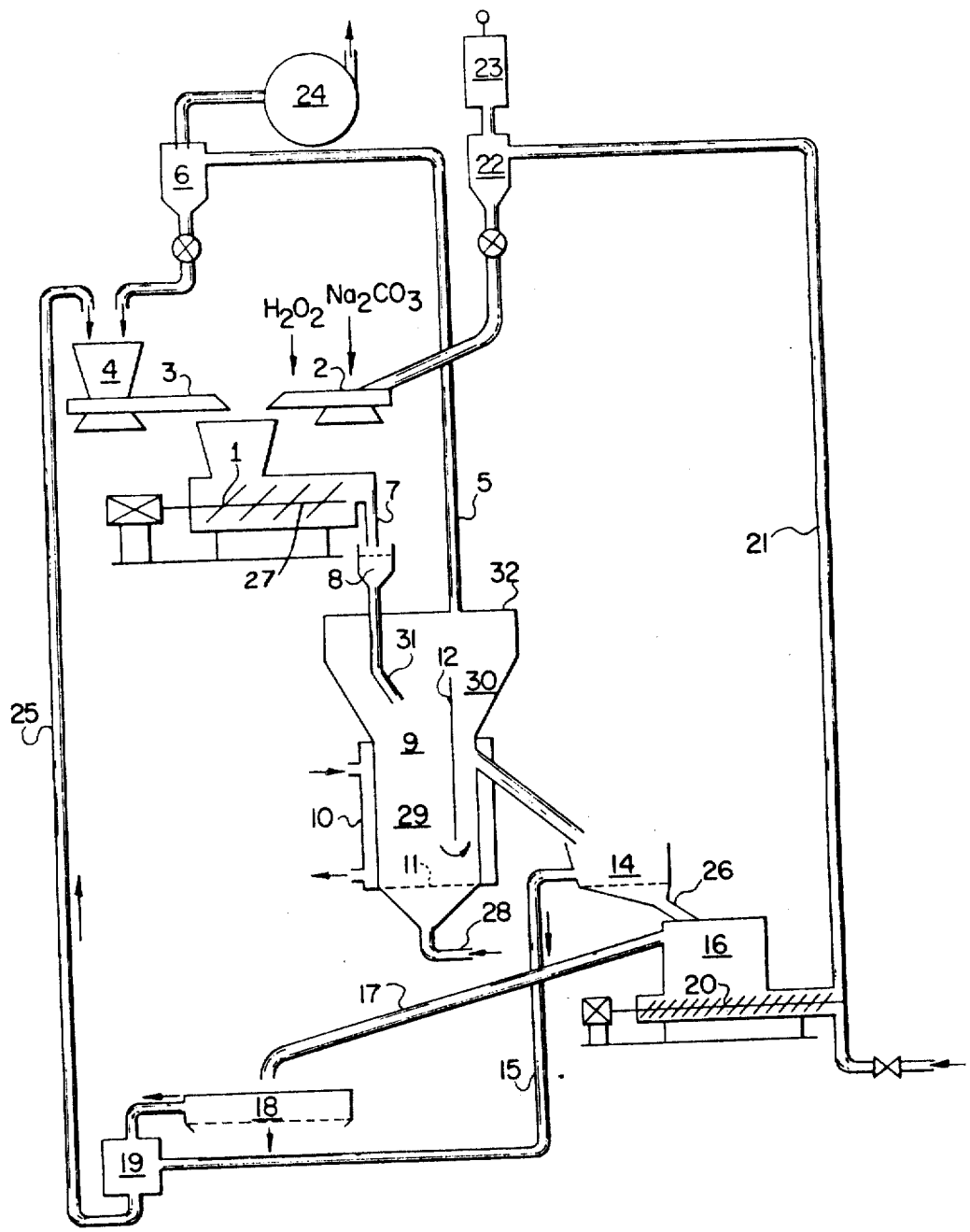

What is claimed is:

1. A process for the manufacture of sodium percarbonate comprising the steps of:
   introducing dry particles of sodium percarbonate into a mixer;
   introducing at ambient temperature an aqueous hydrogen peroxide solution and an aqueous sodium carbonate solution thereby wetting the surface of said particles and forming additional sodium percarbonate, said hydrogen peroxide solution comprising from about 20 to about 70 percent by weight hydrogen peroxide and said sodium carbonate solution comprising from about 15 to about 34 percent by weight sodium carbonate;
   thus producing a wet sodium percarbonate product having a water-content of less than 5 percent by weight;
   drying the wet sodium percarbonate particles in a fluidized bed dryer, said sodium percarbonate particles being fluidized by a gas which leaves the fluidized bed having a relative humidity of not more than 80 percent, said fluidized bed being maintained at a temperature of from about 55°C to about 80°C;
   dividing the dried sodium percarbonate particles into two portions;
   recycling to the mixer one portion of the divided sodium percarbonate particles;
   classifying the second portion of the divided sodium percarbonate particles to select a product having particles within a predetermined size range;
   crushing the particles in said second portion which are larger than the predetermined size range; and
   recycling to the mixer the crushed particles and the particles in said second portion which are smaller than the predetermined size range.

2. A continuous process for the manufacture of an alkali metal percarbonate comprising the steps of:
   introducing dry particles of alkali metal percarbonate into a mixer;
   introducing an aqueous hydrogen peroxide solution and an aqueous solution of a corresponding alkali metal carbonate, to wet the surface of said particles and to form additional percarbonate; thus producing a wet sodium percarbonate product having a water-content of less than 10 percent by weight;
   drying the wet percarbonate;
   withdrawing a portion of dried percarbonate as a product;
   and
   recycling the remaining dried percarbonate to the mixer.

3. A process as claimed in claim 2, wherein percarbonate fines are introduced into the mixer.

4. A process as claimed in claim 2, wherein the hydrogen peroxide solution and the alkali metal carbonate solution are introduced into the mixer at a temperature of from 10°C to 40°C.

5. A process as claimed in claim 2, wherein the alkali metal is sodium or potassium.

6. A process as claimed in claim 2 wherein the aqueous solution of alkali metal carbonate has an alkali metal carbonate concentration of at least 15 percent by weight.

7. A process as claimed in claim 2, wherein the aqueous hydrogen peroxide solution has a concentration of at least 20 percent by weight hydrogen peroxide.

8. A process as claimed in claim 2, wherein alkali metal carbonate and hydrogen peroxide are introduced into the mixer in amounts equivalent to the amount of percarbonate withdrawn from the process.

9. A process as claimed in claim 2, wherein the alkali metal carbonate and hydrogen peroxide are introduced into the mixer in a molar ratio of from 1:1.4 to 1:1.6.

10. A process as claimed in claim 9 wherein the bed is maintained at a temperature of from 55°C to 100°C.

11. A process as claimed in claim 2 wherein the manufacture of an alkali metal percarbonate further comprises the steps of:

separating agglomerates of wet alkali metal percarbonate from the non-agglomerated particles of said percarbonate; and crushing said agglomerates prior to the drying step.

12. A process as claimed in claim 2, wherein the wet sodium percarbonate leaving the mixer has a water-content of less than 10 percent by weight.

13. A process as claimed in claim 12, wherein small particles of sodium percarbonate carried out of the drier by the fluidizing gas are recycled to the mixer.

14. A process as claimed in claim 2 wherein the wet percarbonate is dried in a fluidized bed drier.

15. A process as claimed in claim 14, wherein fluidizing gas leaving the drier has a relative humidity of not more than 80 percent.

16. A process as claimed in claim 2, wherein the step of withdrawing a portion of dried percarbonate as a product comprises the step of selecting particles within a predetermined size range as said product.

17. A process as claimed in claim 16 wherein the step of recycling the remaining percarbonate comprises crushing the particles which in the product selecting step are found to be larger than the predetermined product size range.

* * * * *

UNITED STATES PATENT OFFICE
CERTIFICATE OF CORRECTION

Patent No. 3,917,663          Dated November 4, 1975

Inventor(s)  Willy Kegelart et al.          Page 1 of 2

It is certified that error appears in the above-identified patent and that said Letters Patent are hereby corrected as shown below:

On the cover sheet cancel the illustrative figure, and insert the figure as shown on the attached sheet.

Signed and Sealed this

Sixteenth Day of November 1976

[SEAL]

Attest:

RUTH C. MASON
*Attesting Officer*

C. MARSHALL DANN
*Commissioner of Patents and Trademarks*